United States Patent [19]

Monchil

[11] 3,902,267
[45] Sept. 2, 1975

[54] FISHING LURE

[76] Inventor: Donald L. Monchil, 6019 E. 57 St., Tulsa, Okla. 74135

[22] Filed: Feb. 21, 1974

[21] Appl. No.: 444,645

[52] U.S. Cl. ............ 43/42.23; 43/42.31; 43/42.39; 43/42.47
[51] Int. Cl.² .......................................... A01K 85/00
[58] Field of Search............ 43/42.23, 42.31, 42.39, 43/42.47, 42.22

[56] References Cited
UNITED STATES PATENTS

| | | | |
|---|---|---|---|
| 1,209,022 | 12/1916 | Phinney .......................... | 43/42.23 |
| 1,297,617 | 3/1919 | Welles ........................... | 43/42.23 X |
| 1,333,154 | 3/1920 | Buddle ........................... | 43/42.23 |
| 1,352,054 | 9/1920 | Dills .............................. | 43/42.47 |
| 1,602,329 | 10/1926 | Bonnett ......................... | 43/42.23 X |
| 2,682,128 | 6/1954 | Weigandt ....................... | 43/42.22 |
| 2,769,271 | 11/1956 | Smith ............................. | 43/42.39 X |
| D161,820 | 2/1951 | Brooks ........................... | 43/42.47 UX |

Primary Examiner—Louis G. Mancene
Assistant Examiner—Daniel J. Leach
Attorney, Agent, or Firm—Robert E. Massa

[57] ABSTRACT

A fishing lure comprises a body, a bill spacedly and swingably connected to the body adjacent a forward end of the body to provide means for adjustable positioning of a weight, means on the bill for attaching the lure to a line, and hook means on the body. The bill includes a frame swivably connected to the body and a planar portion mounted on the bill having a plurality of means thereon to receive the line at a choice of locations as desired in order to provide the lure with the capability of having a variety of actions in the water. Swingably attaching the lure to the body in spaced relation thereto alters the flow characteristics of the lure as it moves through the water and allows for a choice of characteristics at variable depths and over a wide range of speeds. Other modifications of the bill are described in addition to the aforementioned planar portion, for example, reduced portions of the bill adjacent to the planar section are shown in various other geometric configurations in order to give the lure further flow characteristics.

18 Claims, 51 Drawing Figures

PATENTED SEP 2 1975　　　　　　　　　3,902,267

SHEET 1

BODY HINGED BILL
DIFINITIONS
$F_1$ = body drag
$F_2$ = buoyant force
$F_3$ = weight
$F_5$ = pull
$F_6$ = bill force at bill centroid
$T$ = bill or section centroid
$r$ = $F_5$ position or pull
$U$ = distance bill hinge to $F_3$ & $F_3$ to $F_2$
$V$ = distance body center to hinge
$\propto$ = bill angle

*Fig. 43a.*

BODY HINGED BILL
DEFINITIONS
$F_1$ = $A_1 C_1 Q$ where
$A_1$ = body projected area
$C_1$ = body drag coefficent
$Q$ = dynamic pressure $(e\frac{v^2}{2})$ where $e$ is density of the fluid and $v$ is velocity of the lure.
$F_6$ = $A_6 C_6 Q$
$A_6$ = bill projected area
$C_6$ = bill drag coefficient

*Fig. 43b.*

$\Sigma$ Body moments about the hinge
$F_1 ( 2 U \sin f + V \cos f )$
$= F_2 ( 2 U \cos f - V \sin f )$ Let $V = mU$; then
$F_1 ( 2 \sin f + m \cos f ) + F_3 ( \cos f - m \sin f ) =$
$F_2 ( 2 \cos f + m \sin f )$ Let $F_2 = F_3$ ; then
$F_1 ( 2 \sin f + m \cos f ) = F_2 \cos f$ Let $F_2 = n F_1$, then
$2 \sin f + m \cos f = n \cos f$, and
$2 \tan f + m = n$, and $\tan f = \frac{n-m}{2}$ Let $F_1 = A_1 C_1 Q$
IF $A_2$ = body projected area when $f = 0$,
then $A_1 = A_2 + A_2 \sin f = A_2 ( 1 + \sin f )$
$F_6 = A_6 C_6 Q$, then
$A_6 = A_7 \sin \propto$, $A_7$ = bill area when $\propto$ = 90

$\Sigma$ bill moments about $F_5$ (pull)
$F_1 r \sin \propto = F_6 ( T-r ) \sin \propto$
$F_1 r = F_6 ( T-r )$, where $r = kT$
$F_1 k = F_6 ( 1-k )$, then
$( A_1 C_1 Q ) k = ( A_6 C_6 Q ) ( 1-k )$ Let $C_1 = C_6$, then
$A_1 k = A_6 ( 1-k )$, and $A_1 k = A_7 \sin \propto ( 1-k )$
$\frac{A_1}{A_7} k = \sin \propto ( 1-k )$ Let $\frac{A_1}{A_7} = AR$, then $AR \cdot k = \sin \propto ( 1-k )$ AR increases with f which is a function of the $F_2$ : $F_3$ couple or buoyant force : weight couple

REMOTE HINGED BILL

*Fig. 45.*

$\Sigma$ Bill moments about $F_5$ (pull)

$F_1 (r \sin \alpha - L \sin a) = F_6 (T-r) \sin \alpha$

Let $r = kT$ and $L = pT$ $F_1 (k \sin \alpha - p \sin a) = F_6 (1-k) \sin \alpha$ $F_1 (k - \dfrac{p \sin a}{\sin \alpha}) = F_6 (1-k)$ $A_1 (k - p \dfrac{\sin a}{\sin \alpha}) = A_7 \sin \alpha (1-k)$ $A_R (k - p \dfrac{\sin a}{\sin \alpha}) = \sin \alpha (1-k)$

FISHING LURE

BACKGROUND OF THE INVENTION

Conventional fishing lures of the type herein described comprise essentially a body and a bill or spoon member hinged or rigidly affixed to the body.

In reeling or trolling the lure through water it is subjected to a number of forces including forward pull at the point of attachment to the leader, drag of the body, resultant gravitational pull of the weight of the lure (and flashers and other attachments), buoyancy of the body and force exerted on and by the bill from the forward pull.

It is desirable to maintain these forces such that the bill affords a turbulent wake to agitate the body, simulating live bait. The forces are largely dependent on the angle of displacement of the bill to the plane of the body, and, as will more particularly appear, the range of displacement in conventional lures is quite limited, beyond which the lure upsets and fails to exhibit desirable agitation. Since the depth of the moving lure is also dependent on this angle of displacement, the depth range of the lure is likewise limited.

SUMMARY OF THE INVENTION

In accordance with the present invention a fishing lure includes a body with a bill hinged or swivelled to it whereby the bill is movable remote from the body. Movement of the bill at a position spaced from the body alters the flow characteristics of the lure as it moves through water to substantially increase the permissible angle of displacement of the bill to the body and accordingly affords a lure operable within a wide range of selected depths.

A principal object of the invention is to provide a lure operable with desirable agitation both on the surface and at selected depths with desirable agitation both on the surface and at several depths while maintaining stability.

Another object is to provide a lure maintaining desirable agitation at all normal speeds of reeling and trolling.

Another object is to provide a lure to which a permanent weight is affixed to precisely position the lure center of gravity (C.G.). Since the lure tends to rotate about its C.G., the precise position of the lure C.G. determines the frequency and amplitude of agitation while providing stability.

Still another object is to provide a lure to which weights and other attachments may be secured without altering flow characteristics, but in the case of weights affecting agitation a small predictable amount. In this connection the lure maintains agitation and stability over a range of weight changes from buoyant to sinking.

Another object and feature is that the lure walks over obstacles, that is, the hinged or swivelled connection permits the lure to pass over obstacles without becoming entangled.

Another feature is that the hinged, remote, semi-independent bill simulates the lateral, side-to-side movement of moving bait, rather than effecting unrealistic up-and-down or bobbing action.

Another feature of the invention resides in the loose swivel connection of the body and lure; the lateral action affords a rhythmic click for audible as well as visual attraction.

The lure is of a clean, simple design and may be formed of a variety of inexpensive but durable materials devoid of nails, screws and extraneous parts, lending to economy of manufacture and maintenance. Flashers and weights, however, may be added to satisfy the most ingenious fisherman.

Further objects and advantages of the invention will be appreciated upon reading the following written description in conjunction with the accompanying drawings.

BRIEF DESCRIPTION OF THE DRAWINGS

In the accompanying drawings:

FIG. 10b is a front view of the pin taken substantially on line 10b of FIG. 10a.

FIG. 25b schematically illustrates the effect of the side flanges on current flow looking at the bill substantially from line 25b of FIG. 25a.

DESCRIPTION OF THE PREFERRED EMBODIMENTS

Throughout the drawings the body of the lure is referred to generally as X and the bill as Z.

Figure 1:
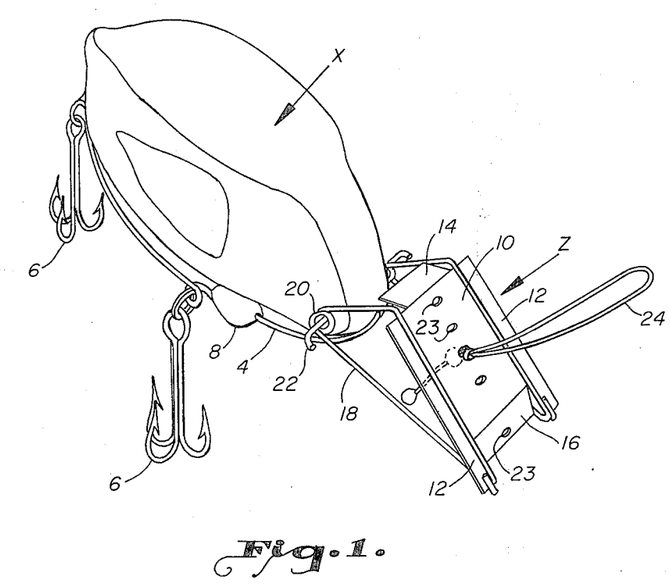
FIGS. 1 and 2 illustrate respectively in perspective and side elevation one embodiment of the invention.
Figure 2:
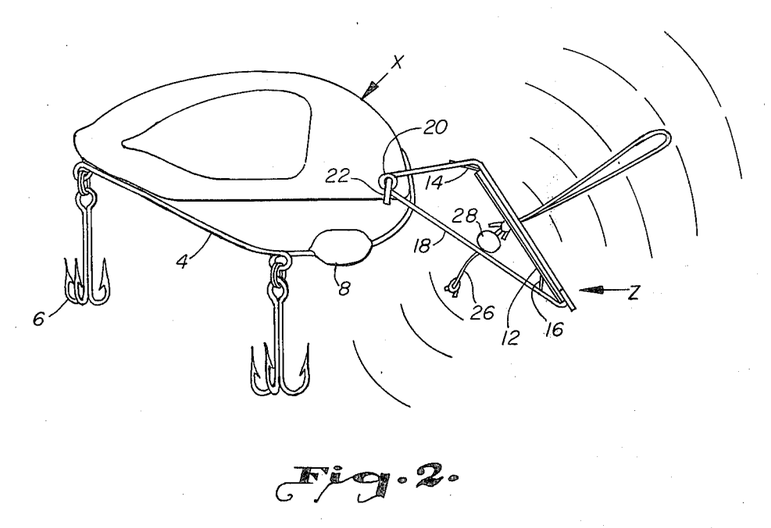

FIGS. 1 and 2 represent body X formed to accept the bill and attaching hardware. A rail 4 suspended under the body is illustrated with attachments, including hooks 6 and a weight 8. The weight precisely positions the lure center of gravity.

Bill Z is represented as a flat or planar member 10 formed with substantially coplanar flanges 12 along the sides and rearwardly disposed fences or tabs 14 and 16 at the top and bottom.

Triangular frames or brackets 18 affixed adjacent side flanges 12 as by welding are each formed with an eye 20 to receive pin 22 hinging the body and bill together.

Bill Z is represented with four holes 23 through the flat surface 10 and one through the bottom tab 16. Holes 23 permit selective attachment to leader 24, shown with a leader extension 26 to facilitate removal of the leader and the optional leader weight 28.

Figure 3:
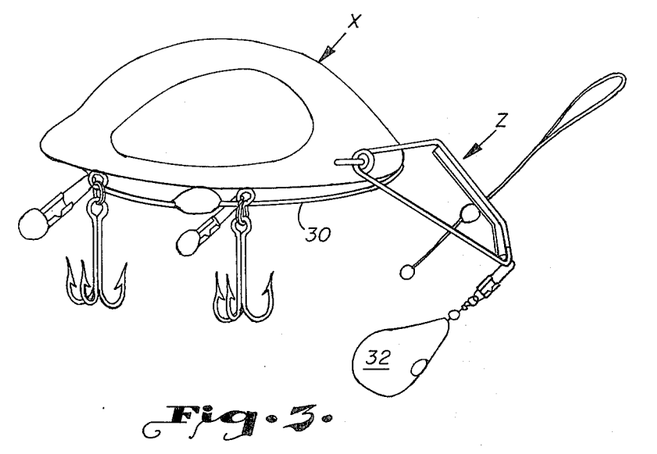
FIGS. 3, 4 and 5 are respectively side, plan and front views of another embodiment.
Figure 4:
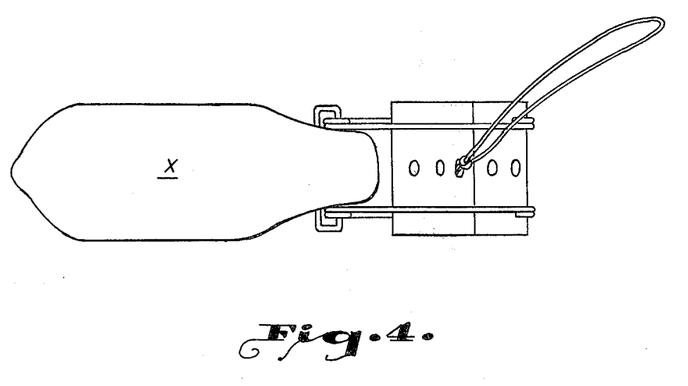
Figure 5:
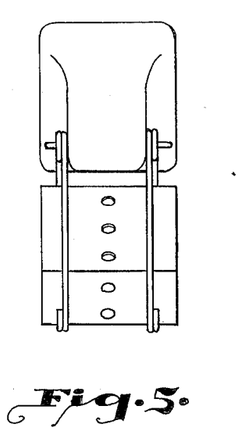

The embodiment of FIGS. 3, 4 and 5 show rail 30 (FIG. 3) suspended in slightly spaced position from body X. Bill Z is formed without the top tab 14 of FIGS. 1 and 2. Water is thus not diverted over the body and body drag is slightly increased. In FIG. 3 the bottom hole is illustrated with an optional flasher 32.

Figure 6:
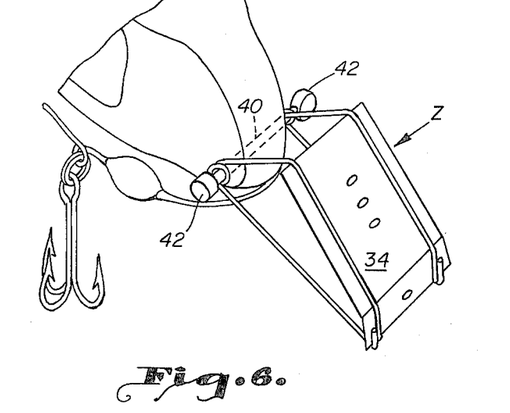
FIGS. 6 and 7 are partial perspective and side views of a third embodiment.
Figure 7:
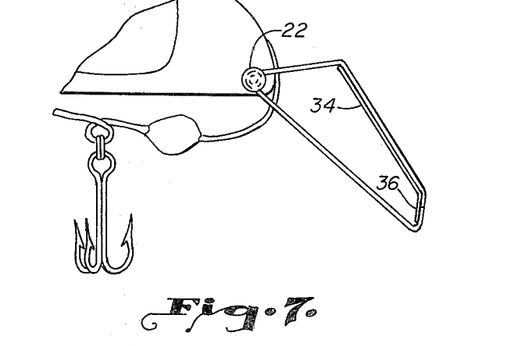

In FIGS. 6 and 7 bill Z is formed of one piece including flat member 34 and downwardly or rearwardly disposed tab 36 affixed to brackets 18. In addition in FIGS. 6, 10$a$ and 10$b$ pin 40 secures the bill and body by heads 42 rather than by turned down ends of pin 22 of previous embodiments and FIG. 4.

Figure 8:
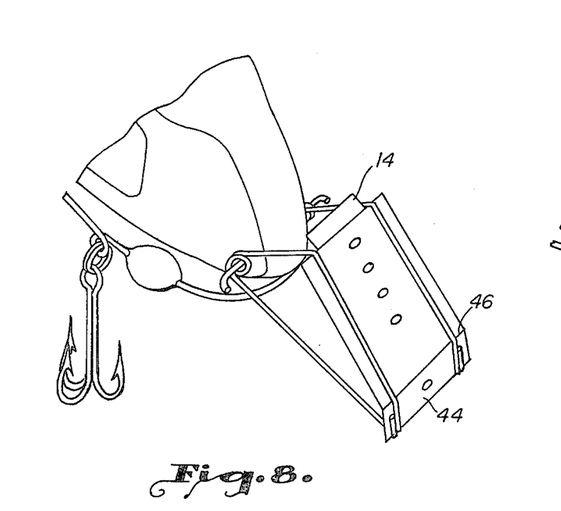
FIGS. 8 and 9 are partial perspective and side views of a fourth embodiment.
Figure 9:
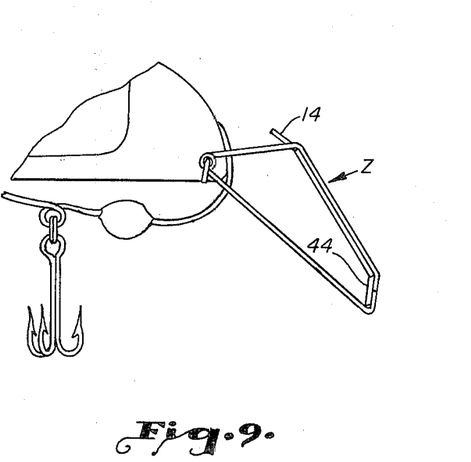
Figure 10A:
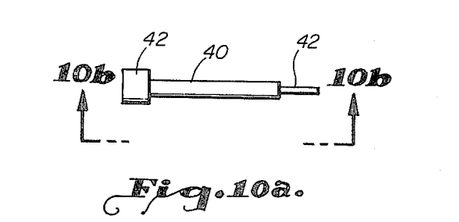
FIG. 10a is a top view of the pin securing the bill to the body in the embodiment of FIGS. 6 and 7.
Figure 10B:
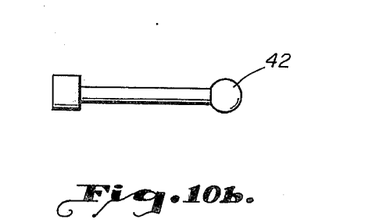

FIGS. 8 and 9 are similar to FIGS. 1 and 2 except that bottom tab 44 is formed along a bend line 46 to span the width of bill Z as in FIGS. 3–5. In this connection triangular brackets 18 appear truncated in side elevation in FIGS. 3–9 to accommodate the increased width of bottom tab 44.

Figure 11:
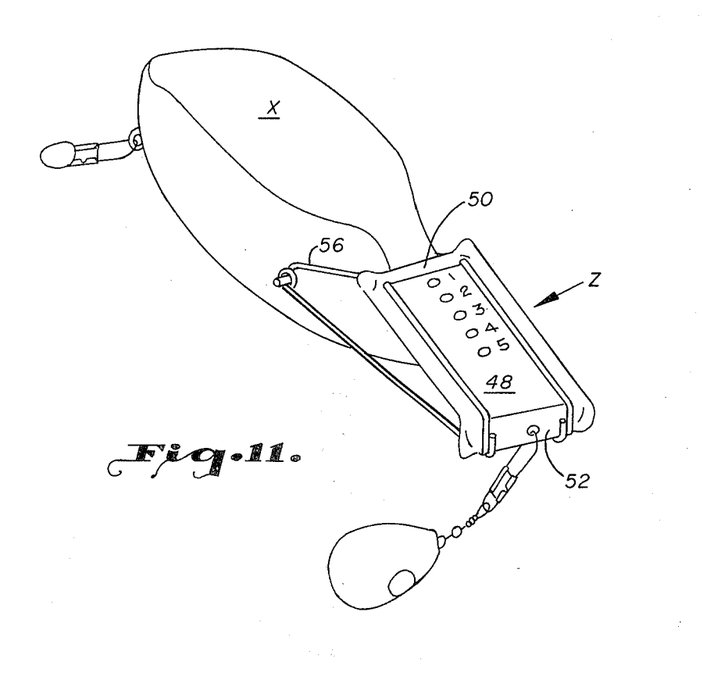
FIG. 11 is a perspective view of a fifth embodiment showing a weight and flasher attached.
Figure 12:
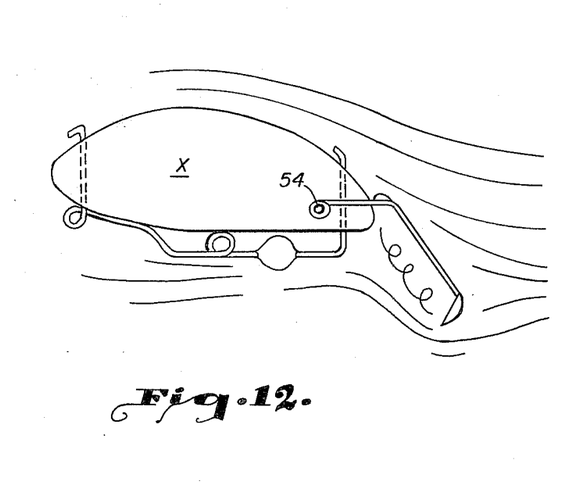
FIG. 12 is a side elevation schematically illustrating current flow effected by the bill.
Figure 13:
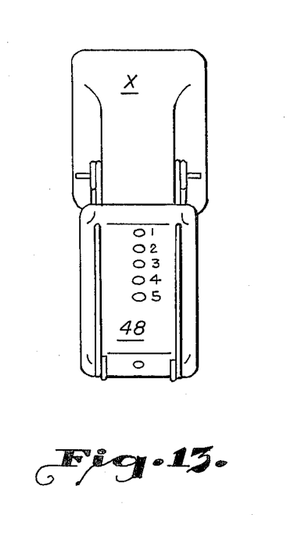
FIG. 13 is a front elevation thereof.

In FIGS. 11–13 bill Z is shown as a substantially flat member 48 with rearwardly, arcuately disposed top and bottom tabs 50 and 52. Pin 54 has been moved rearward on body X relative to pin 22 of previous embodiments, thereby permitting a longer arm 56 on brackets 18 and increasing the pivotal radius of bill Z accordingly.

Figures 14, 15:
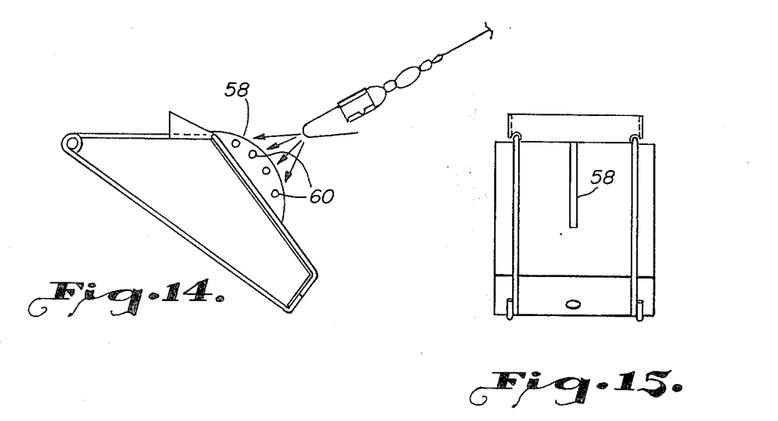
FIGS. 14, 15 and 16 are side, front and plan views of the bill of a sixth embodiment.
Figure 16:
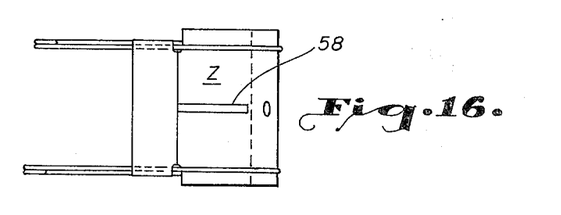

FIGS. 14, 15 and 16 illustrate a modification for selective attachment to the leader. Bill Z is bisected vertically by a raised member 58 perforated with properly spaced holes 60.

Figure 17:
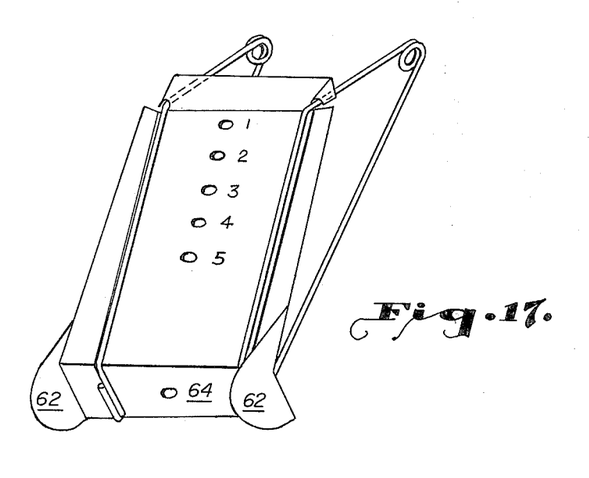
FIG. 17 is a perspective view of a seventh embodiment.
Figure 19:
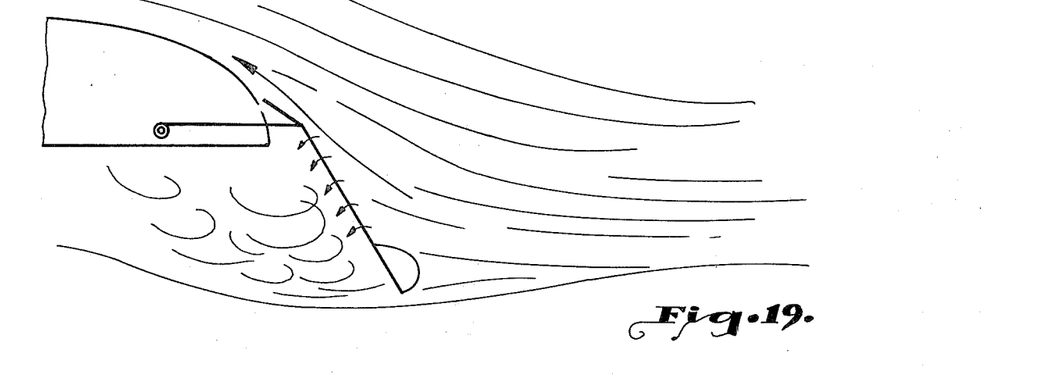
FIG. 19 schematically illustrates the effect upon current flow of equipping the bill with forward protruding flanges and rearwardly disposed top flange.

In FIG. 17 bill Z is formed with side flanges or fences 62 adjacent bottom tab 64. These force fluid upwardly and rearwardly over the bill increasing turbulence as schematically illustrated in FIG. 19.

Figure 18:
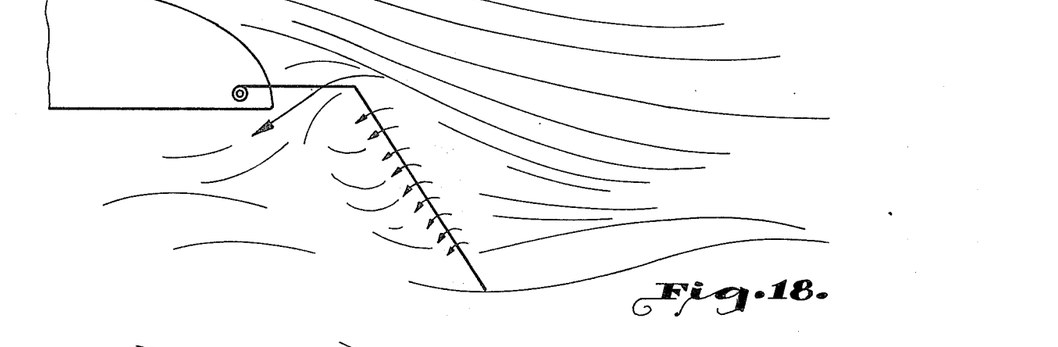
FIG. 18 is a partial side elevation of a simple bill hinged to move remote from the body and showing schematically the effect of the bill on current flow about the lure.
Figure 20:
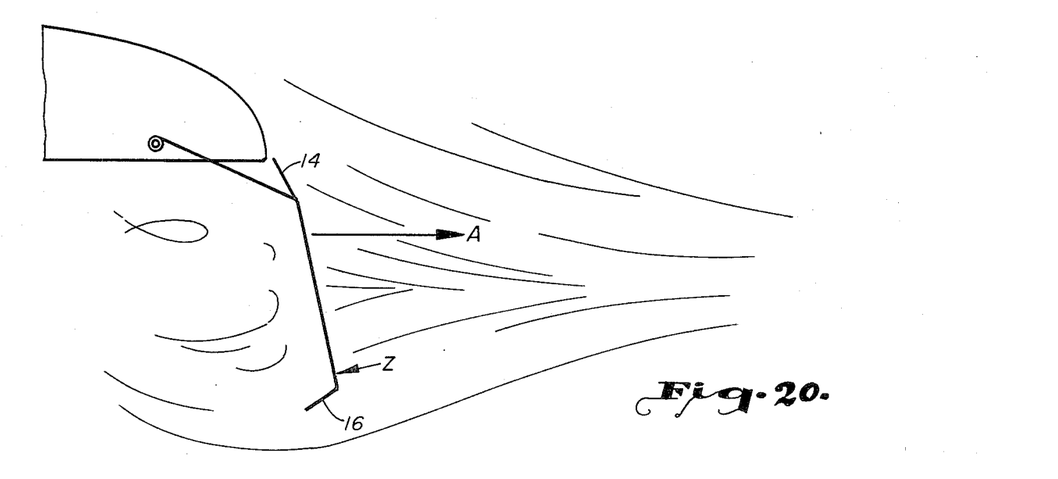
FIG. 20 schematically illustrates the effect on current flow of rearwardly disposed top and bottom flanges on the bill as in the embodiments of FIGS. 1, 2, 8 and 9.

FIG. 20 schematically illustrates the turbulence behind bill Z created by rearwardly disposed top and bottom tabs 14 and 16 with the leader connected at a point relatively high on the bill indicated by arrow A. Compare the relatively unagitated flow about the simple bill of FIG. 18. The bendback or rearward disposed tab 16 reduces the lower bill area confronting the water to stabilize the bill within a desirable range of agitation with the leader attached at position A. The rearward disposed tab 14 prevents the water from flowing between the bill and body thus affecting bill drag and turbulence.

Figure 21:
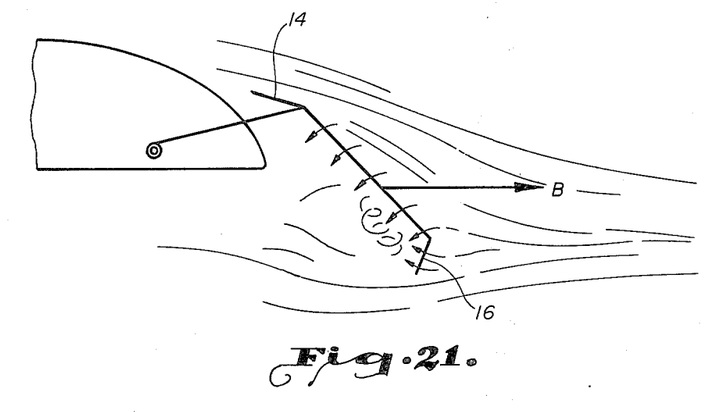
FIG. 21 shows the leader attached at a lower point on the bill.
Figure 22:
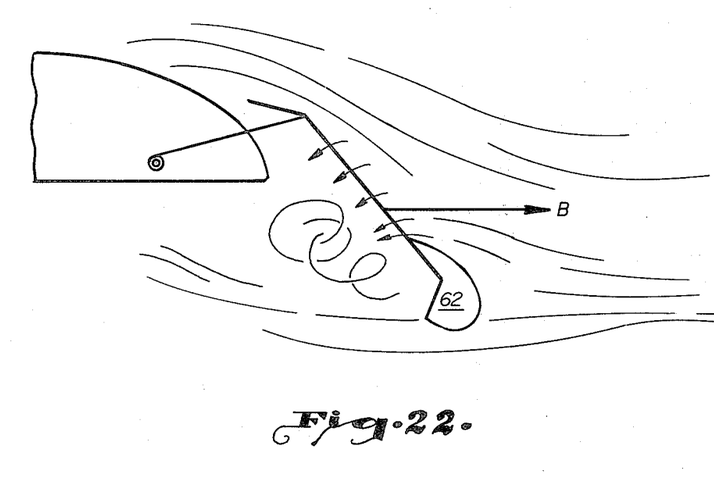
FIG. 22 illustrates the effect on current flow of the side flanges of FIG. 17.

FIG. 21 schematically illustrates the decreased turbulence resulting from increased bill angle and decreased bill area when the leader is lower to position B, and FIG. 22 shows how this may be compensated by side flanges 62 adjacent the bottom.

Figure 23:
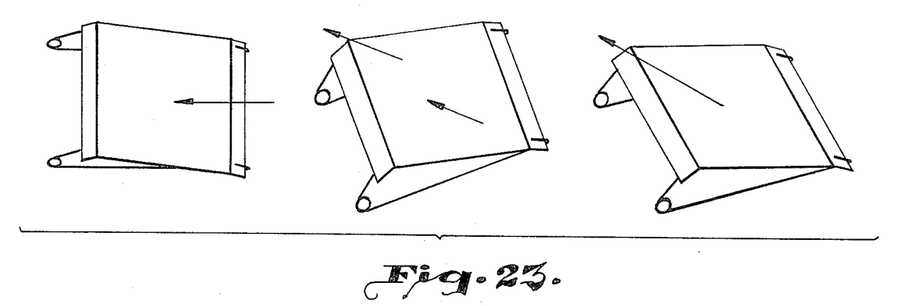
FIG. 23 schematically illustrates the uninterrupted current flow over a substantially planar bill.
Figure 24:
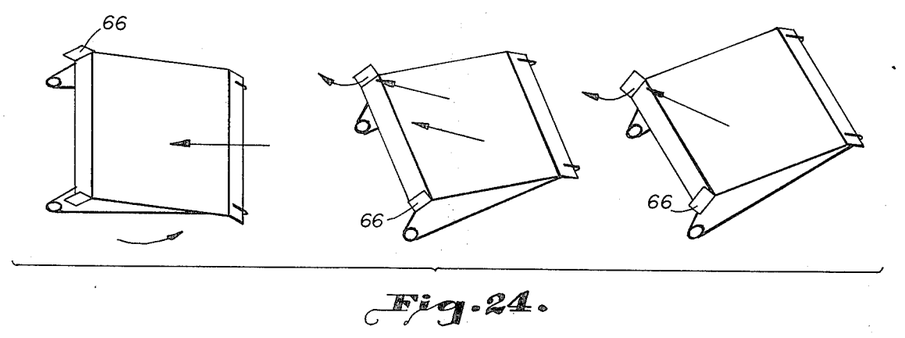
FIG. 24 schematically illustrates the effect on current flow of forwardly protruding flanges on the top of the bill.
Figure 25A:
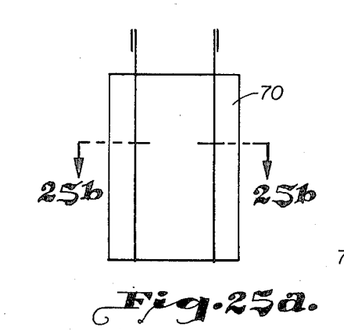
FIG. 25a is a front elevation of a bill formed with forwardly protruding flanges along its sides.
Figure 25B:
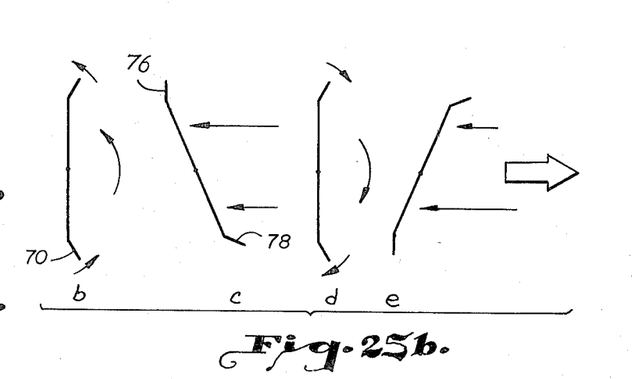
Figure 26:
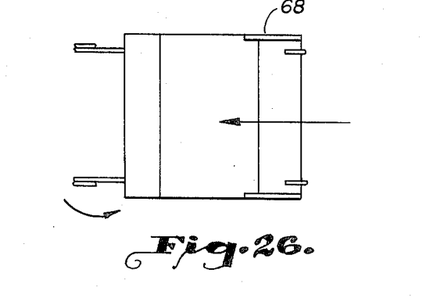
FIG. 26 is a plan view of a bill formed with forwardly protruding flanges at the bottom sides.
Figure 27:
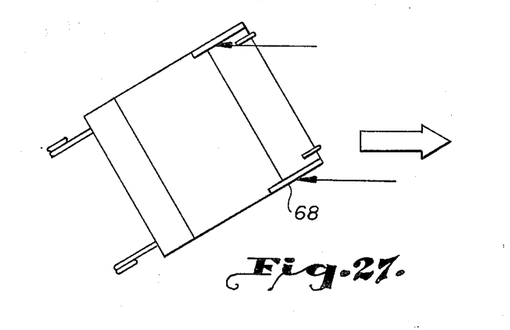
FIG. 27 schematically illustrates current flow as effected by the flanges of FIG. 26.

FIG. 23 schematically illustrates the uninterrupted flow of water over a flat bill, and FIGS. 24–27 illustrate the effect of forwardly protruding side flanges. The flanges may be disposed perpendicular at the top (66 in FIG. 24), at the bottom (68 in FIGS. 26 and 27) or flanges 70 may extend obtusely along the sides of the bill (FIGS. 25$a$, 25$b$). All flanges increase the bill area in the direction of upset as particularly appears in FIG. 25$b$. Unagitated positions are indicated at $b$ and $d$. As the bill agitates to position $c$ the trailing (or top, as viewed) flange 76 is perpendicular to current, increasing bill area in that direction, whereas the leading (or bottom, as viewed) flange 78 is acute to current, diminishing bill area in that direction. At position $e$ the flange areas are reversed.

Figure 28:
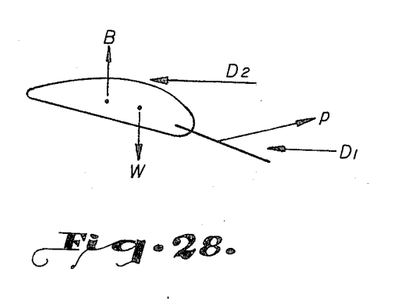
FIG. 28 illustrates the forces operable upon a lure formed with the bill rigidly affixed to the body.

FIG. 28 illustrates a conventional fixed lure in which the body and bill are rigidly affixed or attached. In the drawing B represents buoyancy, W weight, $D_1$ and $D_2$ lower and upper forces and P pull (point of attachment to the leader). If the reader will visually rotate the lure it will be appreciated that drag alters drastically with slight rotation and the lure upsets. Consequently, the lure is operable within a very limited depth range.

Figure 29:
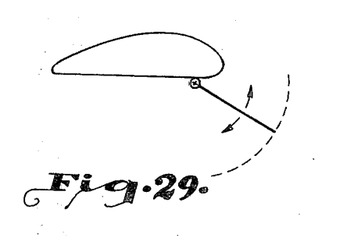
FIGS. 29 and 30 illustrate a bill hinged directly to the lure body.
Figure 30:
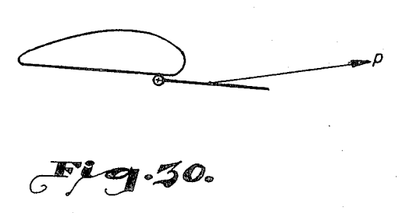
Figure 31:
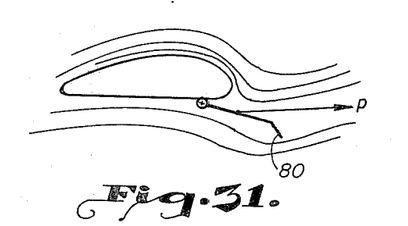
FIGS. 31, 32 and 33 schematically illustrate the operation of such a bill formed with a downward or rearward projecting flange along the bottom.
Figure 32:
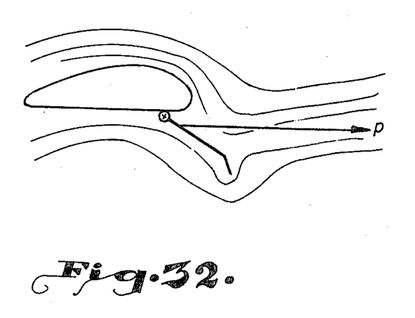
Figure 33:
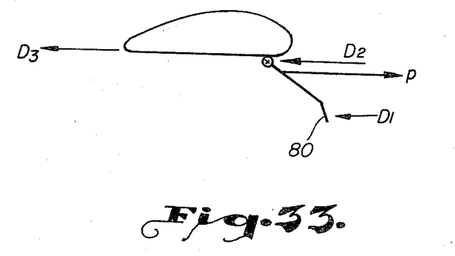

FIGS. 29 and 30 illustrate a simple hinged lure wherein the bill is hinged directly to the body. This arrangement poses somewhat the reverse of the problem posed by the fixed bill: slight displacement of the bill greatly increases or decreases bill area, while body drag remains relatively constant. FIGS. 31–33 meliorate the problem by bending the bill downwardly or rearwardly at its forward or lower end as at 80.

Figure 43:
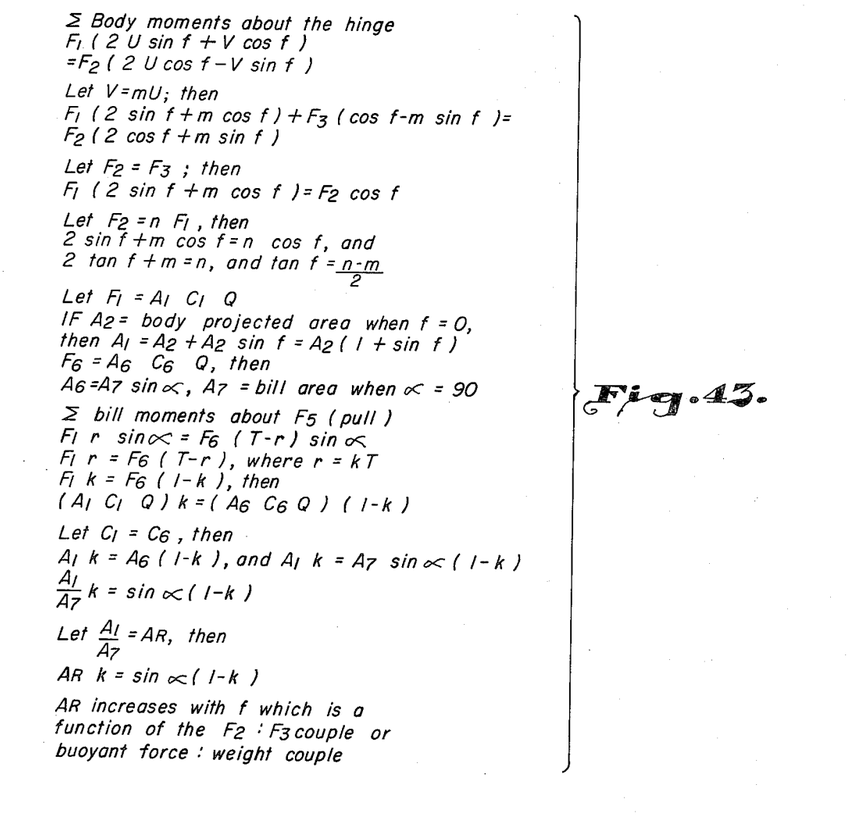
FIG. 43 sets forth the body moments about the hinge joining the bill and body of a body hinged lure (diagramed in FIG. 43$a$) and moments at the point of attachment of the bill to the leader (diagrammed in FIG. 43$b$).
Figure 43A:
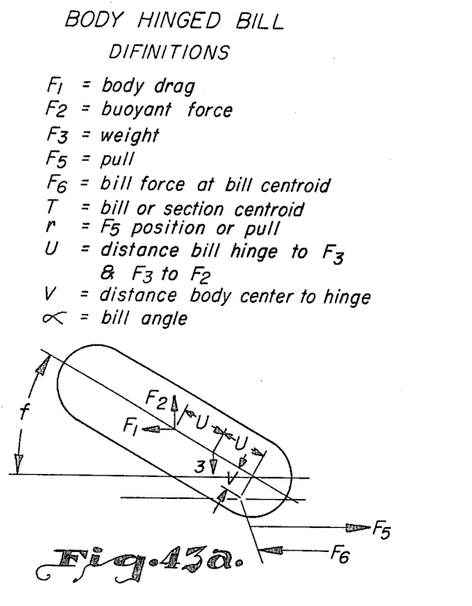
Figure 43B:
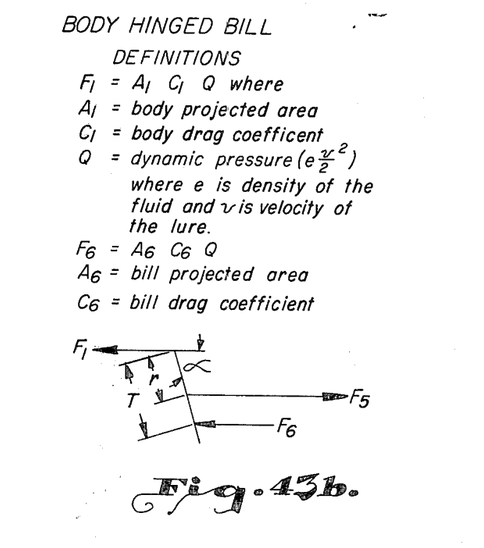
Figure 44:
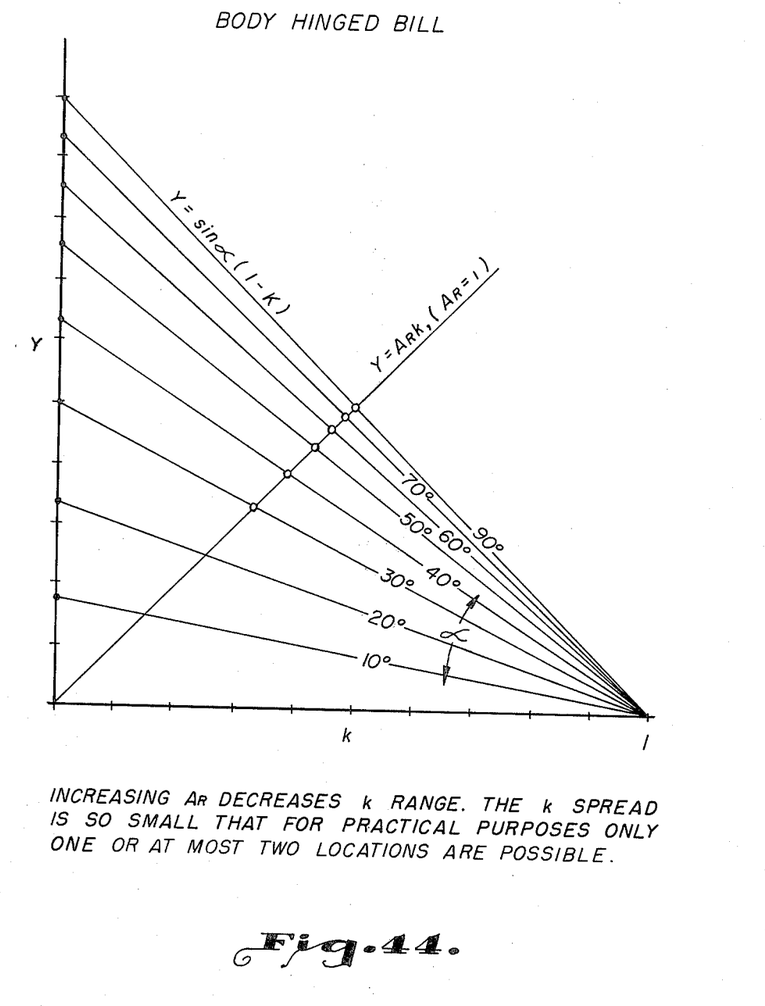
FIG. 44 graphically illustrates the limited bill angles compatible with the physical limits of a body hinged bill.

The limitations of the simple hinged lure are analyzed in FIGS. 43, 43a, 43b and 44. FIG. 43a diagrams the moments about the hinge, FIG. 43b diagrams the moments about the attachment to the leader (F5) and FIG. 43 trigonometrically sets forth the products of these moments about the hinge and leader attachment. FIG. 44 graphically illustrates that angular displacement of the bill is so limited in this type of body hinged lure that only one or possibly two running positions are possible.

Figure 34:
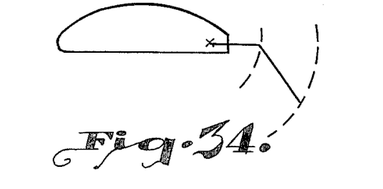
FIGS. 34 and 35 schematically illustrate a lure formed in accordance with the present invention wherein the bill is hinged to move remote from the body.
Figure 35:
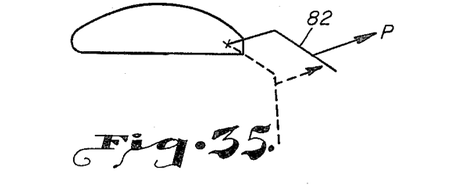
Figure 36:
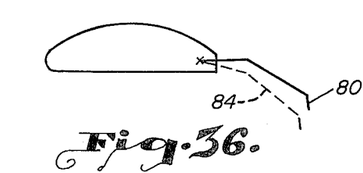
FIG. 36 illustrates such a bill formed with a downwardly or rearwardly projecting flange at its bottom.

FIGS. 34 and 35 illustrate a lure formed in accordance with the present invention wherein the bill is hinged to move remote from the body. With the bill in raised position (solid line 82, FIG. 35) the bill area is decreased, but body drag is also decreased since only the top of the body is exposed. As the bill is lowered the bill area increases, but the exposed area of the body also increases to increase drag. After the bill has exposed the entire body, further lowering greatly increases the bill area, but body drag remains relatively constant. FIG. 36 compensates for this by an obtuse bend 80 at the forward or lower end of the bill; after the bill has been lowered to expose the entire body (dotted line 84 in FIG. 36) further lowering decreases the bill area at bend 80.

Figure 37:
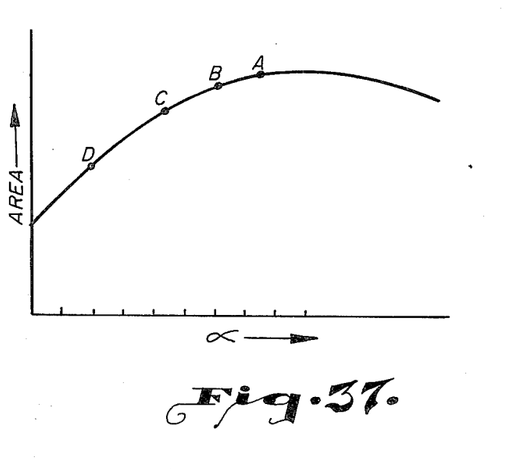
FIG. 37 graphically illustrates the increase of the bill area as the angle of the bill increases.
Figure 38:
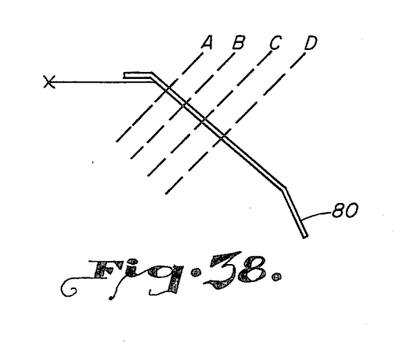
FIG. 38 is a partial cross section of the bill indicating points of attachment to the leader to correspond with specific positions in FIG. 37.
Figures 39, 40:
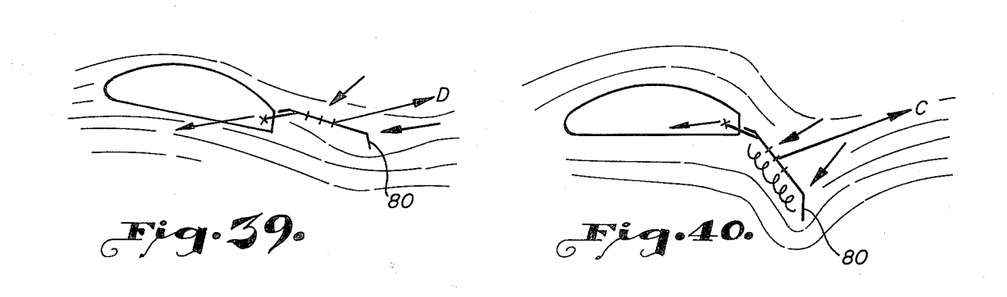
FIGS. 39, 40, 41 and 42 schematically illustrate current flow about a lure formed in accordance with the present invention showing the effect of attaching the leader at different positions on the bill.
Figure 41:
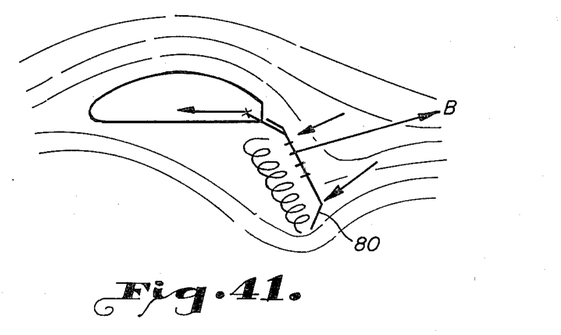
Figure 42:
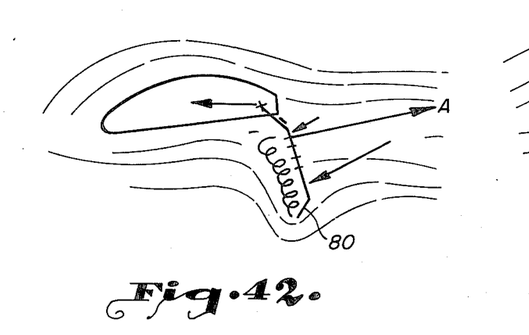

FIGS. 39–42 schematically illustrate operation of the lure formed with lower bend 80 with the leader selectively attached at different running positions A, B, C and D of FIG. 38. This is graphically illustrated in FIG. 37. The bill area resulting from the angle afforded by leader attachments at all positions, A thru D, is balanced by the resulting forces to provide different running depths. The resulting forces balance out because of changing body drag caused by body frontal area changes and changing bill forces. The bill forces change as a result of the bill area change, as shown in FIG. 37, and as a result of the flow changes which are determined by the bill angle and modified as required by the upper and lower rearward disposed tabs. At position D, the lure runs the deepest with the least agitation. The depth being determined by the bill forces and the agitation determined by the relationship of the forces to the lure center of gravity. The lure runs at an intermediate depth at position C and the lure runs at a shallow depth at position B with increasing agitation. At position A, the lure runs on the surface. It is at this position that the upper rearward disposed tab becomes most important. It controls flow over the upper bill and consequent forces to prevent the bill from tripping over causing the lure to slide along the top. The lower rearward disposed tab provides stability at the lower depths and controls flow and influences depth.

Figure 45:
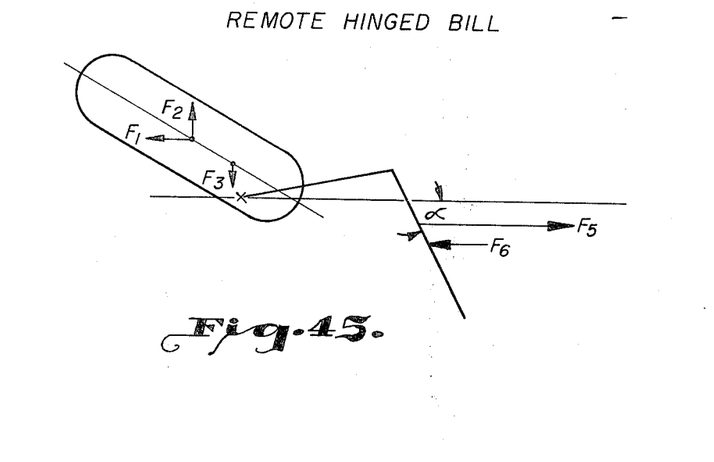
FIG. 45 diagrams the forces acting on the lure of the present invention.
Figure 46:
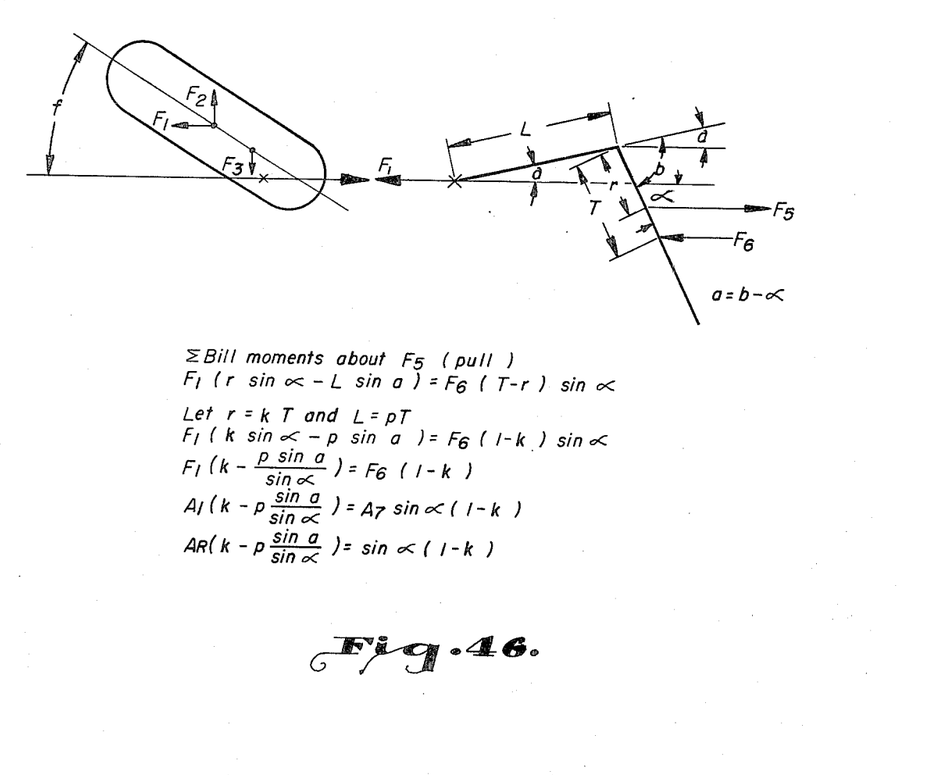
FIG. 46 diagrams the moments of the invention about the point of attachment with the leader and also about the hinge connecting the bill and body, and trigonometrically sets forth the bill moments about the point of attachment with the leader.
Figure 47:
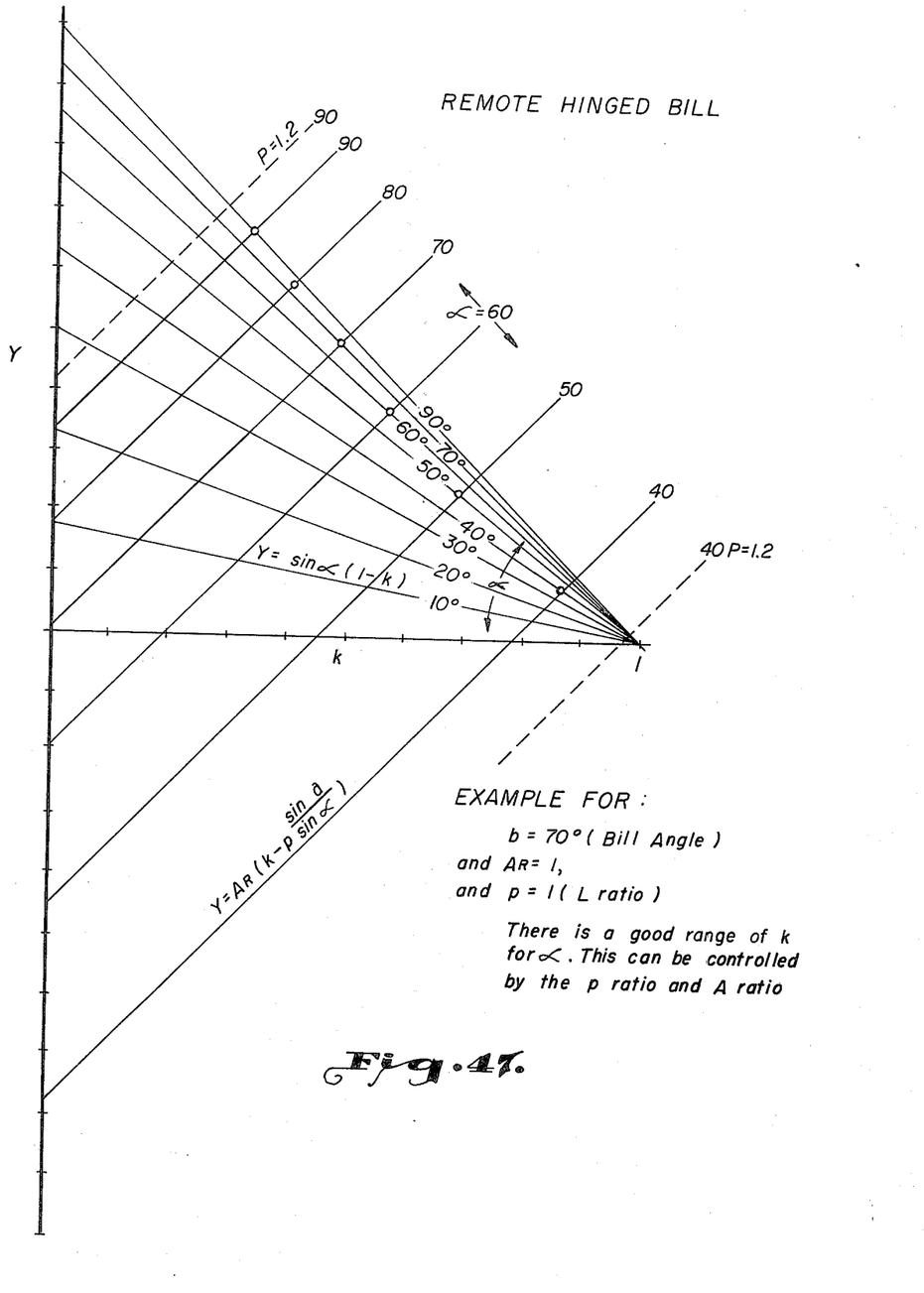
FIG. 47 graphically illustrates the broad range of bill angles compatible with the physical limits of the bill in a lure formed according to the present invention.

FIG. 45 diagrams the forces of this lure. FIG. 46 analyzes the moments about the point of attachment with the leader and about the hinge joining the body and bill and trigonometrically sets forth the composite moments. FIG. 47 graphically illustrates the broad range of bill angles and consequent range of operable depths for the lure.

The body of the invention has been described without regard to composition or configuration, and the bill embodiments shown are rudimentary hydrafoils. It will be appreciated that modifications may be introduced without defeating the variable depth operability of the lure so long as the bill and body are joined for semi-independent operation.

I claim:
1. In a fishing lure including a body and a bill:
first means joining the body to the bill whereby they are independently movable at spaced positions,
second means for attaching said lure to a line to selectively effect movement at said spaced positions,
hook means affixed to said lure, and
said bill includes a frame and a planar portion mounted on said frame.
2. A fishing lure as described in claim 1, wherein:
said bill moves swingably about a normally horizontal axis which is normal to the longitudinal axis of the body.
3. A fishing lure as described in claim 2, wherein:
said bill further includes a lower tab member disposed at an angle at the lower edge of said planar portion.
4. A fishing lure as described in claim 3, wherein:
said bill further includes an upper tab member disposed at an angle at the upper edge of said planar portion.
5. A fishing lure as described in claim 4, wherein:
said bill includes a forwardly disposed fence member adjacent each corner of said lower tab member.
6. A fishing lure as described in claim 5, wherein:
said bill includes a forwardly disposed fence member adjacent each corner of said upper tab member.
7. A fishing lure as described in claim 1, wherein:
said bill includes forwardly disposed flanges along each side thereof.
8. A fishing lure as described in claim 2, wherein:
said bill includes forwardly disposed flanges along each side of said planar portion.
9. A fishing lure as described in claim 8, wherein:
said bill includes means for attachment of a weight.
10. A fishing lure as described in claim 1, wherein:
said body includes a rail member attached thereto and extending longitudinally thereof upon which rail member a weight may be positioned.
11. A fishing lure as described in claim 10, wherein:
said weight may be adjustably positioned.
12. A fishing lure as described in claim 11, wherein:
said rail member includes secondary means to attach a hook.
13. A fishing lure as described in claim 7, wherein:
said body includes a rail member attached thereto and extending longitudinally thereof upon which rail member a weight may be positioned.
14. A fishing lure as described in claim 13, wherein:
said weight may be adjustably positioned.
15. A fishing lure as described in claim 14, wherein:
said rail member includes secondary means to attach a hook.
16. A fishing lure as described in claim 9, wherein:
said body includes a rail member attached thereto and estending longitudinally thereof upon which rail member a weight may be positioned.
17. A fishing lure as described in claim 16, wherein:
said weight may be adjustably positioned.
18. A fishing lure as described in claim 17, wherein:
said rail means includes secondary means to attach a hook.

* * * * *